Patented Oct. 31, 1944

2,361,527

UNITED STATES PATENT OFFICE 2,361,527

METHOD OF UNITING FIBROUS MATERIALS

Frederick S. Bacon, Newton, Mass., assignor to Monsanto Chemical Company, St. Louis, Mo., a corporation of Delaware No Drawing. Application July 25, 1939, Serial No. 286,346

13 Claims. (Cl. 154—40)

The present invention relates to the use of certain adhesives in uniting fibrous material such as pieces of leather, leather board, cloth and the like and more particularly in the manufacture of shoes.

In the uniting of the outsole with the shoe upper a pyroxylin cement has heretofore generally been employed. The use of such cements is, however, accompanied with many disadvantages. Thus, where such cements are employed, it is necessary to apply a liquid activator to the dried cement in order to obtain a firm union between the two leather surfaces. Activation by heat is impractical because of the inherent properties of pyroxylin.

In accordance with the present invention I employ polyvinyl acetal resins so treated as to be substantially free of cold flow under conditions where shoes are ordinarily worn and also so compounded as to permit of activation by heat at temperatures below that at which leather is adversely affected by the heat.

Thus, in uniting pieces of leather and the like according to the process of the present invention, it is merely necessary to expose the cemented outsole to a source of radiant heat for a period of from 30 to 60 seconds, during which time the heat softens the adhesive to such an extent that it will not set up in the 15 to 20 seconds necessary for assembling the sole and shoe upper and placing in a suitable press for completing the union. Even then, there is sufficient residual heat in the cement film and the leather to activate the film on the shoe bottom, and when it cools a strong flexible bond is obtained. In employing the process of the present invention it has been found that the cemented surface can be activated by heating to a temperature of about 125° C., which is considerably lower than the temperature at which leather begins to char. This improvement in the union of pieces of leather is of the utmost importance, as leather begins to scorch at a temperature of about 145° C. Furthermore, in the process of this invention it is possible to postpone the actual period of activation to more than a week after the cement has been applied.

Any convenient method of heating may be utilized in the activation of the adhesive, the only requirement being that the temperature shall not exceed the scorch point of the material or materials being united. The use of radiant heat is mentioned above. Heat may also be applied directly, if desired, or by means of high frequency alternating electric current.

More particularly, partial polyvinyl acetal resins are employable according to the present invention. These are described in United States Letters Patent to Morrison, Skirrow and Blaikie, Reissue No. 20,430 dated June 29, 1937. I prefer to employ a resin made with butyraldehyde or formaldehyde, for instance, one made with butyraldehyde and having from 16 to 22% hydroxyl groups figured as polyvinyl alcohol and sometimes sold under the trade name of "Butvar"; or one made with formaldehyde, and having 8% hydroxyl groups figured as polyvinyl alcohol and sometimes sold under the trade name of "Formvar". The resin is combined with proper amounts of a suitable plasticizer for example preferably dibutyl phthalate, or dimethyl phthalate.

Certain materials, which I have discovered, have the property of stopping cold flow of these resins even when present in quantities as small as of one part to 100 parts of resin and 40 to 50 parts of plasticizer. Among these are metallic copper, 500 mesh, aluminum powder, 150 and 450 mesh; and nickel powder 150 mesh. A chrome orange pigment, consisting essentially of sixty per cent lead chromate and forty percent lead oxide, ($Pb_3O_4$) when used in the proportion of one part to 100 parts of resin and 40 to 50 parts of plasticizer completely stops cold flow at 50° C. under a tension of 500 grams per inch of width. Burnt umber appears to be equally good. Many other materials when used in the proportion of five parts or more to 100 parts of resin also exhibit this remarkable property of stopping cold flow of the resin. Some such materials are as follows:

Pigments

Cadmolith
Cadmium red
Ultramarine
Carbon black
Burnt sienna
Burnt umber

Metallic oxides

Zinc oxide
Lead oxide
Chrome oxide
Yellow iron oxide
Red iron oxide
Titanium oxide
Manganese oxide

Metals

Powdered copper, 500 mesh
Powdered aluminum, 450 mesh

Chrome pigments

Chrome yellow
Chromium oxide

Miscellaneous

Barium sulfate
Wood flour, 100 mesh
Sulfur
Silica powder

"Cadmolith" mentioned above is the trade name of a group of mixed cadmium and lithopone pigments. (Physical & Chemical Examination of Paints, Varnishes, Lacquers and Colors by H. A. Gardner, 9th edition, page 502 (1939).

Except as otherwise specified these materials should preferably be ground to 325 mesh, but this fineness is not necessarily required.

We have also found that many of these materials will greatly increase the adhesion of the resins to fibrous materials, such as sole leather.

For example, a solution of 100 parts "Butvar" resin (approximately 20% polyvinyl alcohol content) and 30 parts dibutyl phthalate in 500 parts of methanol will not adhere sufficiently firmly to a fleshed and roughened piece of sole stock so as to give a bond which would be satisfactory in the making of shoes. The addition of 1 part of burnt umber pigment thoroughly dispersed in the above solution produces an excellent bond between a shoe upper tnd an outsole in the manner and at the temperatures given above which can only be pulled apart with great difficulty.

The following materials when used in the proportion of 5 parts per 100 parts of resin have been found to increase the bond between pieces of leather to a substantial and satisfactory extent, when employed according to the general process of this invention.

*Pigments*

Cadmolith
Cadmium red
Ultramarine

*Chrome pigments*

Chrome orange
Chrome yellow

*Metallic oxides*

Yellow iron oxide
Red iron oxide
Manganese oxide

*Powdered metals*

Copper, 500 mesh
Aluminum, 450 mesh

The most successful mixture which I have so far found which is capable of being activated by radiant heat at temperatures sufficiently low that they do not scorch leather is, 100 parts partial polyvinyl acetal resin made with butyraldehyde and having an hydroxyl content of approximately 20%; 30 parts of plasticizer (dibutyl phthalate); 500 parts solvent (methanol), and 1 part burnt umber.

Among other formulae which have been satisfactorily employed are the following:

| | Parts by weight |
|---|---|
| Butvar resin | 100 |
| Dibutyl phthalate | 30 |
| Chrome orange pigment (325 mesh, containing approximately 60% lead chromate and 40% lead oxide) | 1 |
| Methanol | 480 |

The adhesives made according to the preceding formula effectively prevent cold flow at 50° C. under the tension of 500 g. on a bond surface one inch wide.

| | Parts by weight |
|---|---|
| "Butvar" resin | 100 |
| Dibutyl phthalate | 30 |
| Zinc oxide or titanium dioxide | 5 |
| Methanol | 480 |

The adhesive made according to the preceding formula is not subject to cold flow at 50° C. under the conditions given above.

Cements made according to the above formulae are particularly adapted for use where the adhesive is to be activated by heat within a few hours after its application. Where activation is to be delayed for a week or more, a small amount, for example about 0.5 to 5 parts of a moderately high boiling solvent such as carbitol (the monoethyl ether of diethylene glycol) should be added for each 100 parts by weight of "Butvar." For example I have found that if 1 part of carbitol is added to any of the above formulae the dried cement film can be readily activated by radiant heat at any time up to a week after application. If it is necessary to delay the activation for a longer period, a little more carbitol can be used to advantage.

All the foregoing formulae contain volatile solvent and produce liquid cements. These cements are used in the ordinary manner in which shoe cements are employed, the adhesive being spread on the stock and allowed to dry until the volatile solvent has evaporated. However, I do not limit my invention to adhesives or cements which are liquid owing to the presence of volatile solvents, since they may be made also in the form of a film or possibly a powder which is applied to the surfaces to be joined. In any case they would be capable of activation by heat. It is not essential to employ the proportion of volatile solvent given in the above specific examples. Thus, the amount of solvent may be decreased or even if desirable no solvent may be employed. However, as the amount of volatile solvent is decreased, the temperature of the cement as it is applied is preferably increased.

The film of adhesive produced in accordance with my invention has the exceptional property of being capable of being softened by radiant heat as well as by directly aplied heat. My novel adhesive is, therefore, particularly adapted for use with cemented tapes and galloon which are used to a large extent in the manufacture of shoes. Also it may be used on skived edges of uppers which are to be held in folded position by adhesive.

This application is a continuation-in-part of my prior application Serial No. 209,977, filed May 25, 1938, now Patent No. 2,240,027 and is limited solely by the claims appended hereto.

I claim:

1. A process of uniting pieces of fibrous materials of non-mineral origin by means of a thermoplastic adhesive comprising a polyvinyl acetal resin to which has been added an inert inorganic pigment in an amount not exceeding substantially 5% by weight of the resin, which reduces the cold flow without detriment to the adhesive properties of the resin, which comprises applying said adhesive to said fibrous materials, activating said adhesive solely by means of the external application of heat at a temperature below the scorch point of the fibrous materials, and then placing the pieces of fibrous materials with the adhesive treated surfaces in contact with each other, and uniting by means of pressure.

2. A process of uniting pieces of fibrous materials of non-mineral origin by means of a thermoplastic adhesive comprising a partial polyvinyl acetal resin to which has been added an inert inorganic pigment in an amount not exceeding substantially 5% by weight of the resin, which reduces the cold flow without detriment to the adhesive properties of the resin, which comprises applying said adhesive to said fibrous materials, activating said adhesive solely by means of the external application of heat at a temperature below the scorch point of the fibrous materials, and then placing the pieces of fibrous materials with the adhesive treated surfaces in contact with each other, and uniting by means of pressure.

3. A process of uniting pieces of fibrous materials of non-mineral origin by means of a thermoplastic adhesive comprising a partial polyvinyl acetal resin to which has been added an inert inorganic pigment in an amount not exceeding substantially 5% by weight of the resin, which reduces the cold flow without detriment to the adhesive properties of the resin, which comprises applying said adhesive to said fibrous materials, activating said adhesive by radiant heat at a temperature below the scorch point of the fibrous materials, and then placing the pieces of fibrous materials with the adhesive treated surfaces in contact with each other, and uniting by means of pressure.

4. A process of uniting pieces of leather by means of a thermoplastic adhesive comprising a partial polyvinyl acetal resin to which has been added an inert inorganic pigment in an amount not exceeding substantially 5% by weight of the resin, which reduces the cold flow without detriment to the adhesive properties of the resin, which comprises applying said adhesive to said leather, activating said adhesive by radiant heat at a temperature below the scorch point of the leather, and then placing the pieces of leather with the adhesive treated surfaces in contact with each other, and uniting by means of pressure.

5. A process of uniting pieces of non-mineral fibrous materials by means of a thermoplastic adhesive comprising a partial polyvinyl acetal resin made with butyraldehyde to which has been added an inert inorganic pigment in an amount not exceeding substantially 5% by weight of the resin, which reduces the cold flow without detriment to the adhesive properties of the resin, which comprises applying said adhesive to said fibrous materials, activating said adhesive by radiant heat at a temperature below the scorch point of the fibrous materials, and then placing the pieces of fibrous materials with the adhesive treated surfaces in contact with each other, and uniting by means of pressure.

6. A process of uniting pieces of non-mineral fibrous materials by means of a liquid adhesive comprising a partial polyvinyl acetal resin, a plasticizer therefor, a moderately high boiling solvent and an inert inorganic pigment in an amount not exceeding substantially 5% by weight of the resin, which reduces the cold flow without detriment to the adhesive properties of the resin, which comprises applying the adhesive to said fibrous materials, activating said adhesive by radiant heat at a temperature below the scorch point of the fibrous materials, and then placing the pieces of fibrous materials with the adhesive treated surfaces in contact with each other, and uniting by means of pressure.

7. A process of uniting pieces of leather by means of a liquid adhesive comprising a partial polyvinyl acetal resin, a plasticizer therefor, a moderately high boiling solvent and burnt umber in an amount not exceeding substantially 5% by weight of the resin, which comprises applying the adhesive to leather, activating said adhesive by radiant heat at a temperature below the scorch point of the leather, and then placing the pieces of leather with the adhesive treated surfaces in contact with each other, and uniting by means of pressure.

8. A process of uniting pieces of leather by means of a liquid adhesive comprising a partial polyvinyl acetal resin, a plasticizer therefor, a moderately high boiling solvent and a mixed cadmium and lithopone pigment in an amount not exceeding substantially 5% by weight of the resin, which comprises applying the adhesive to leather, activating said adhesive by radiant heat at a temperature below the scorch point of the leather, and then placing the pieces of leather with the adhesive treated surfaces in contact with each other, and uniting by means of pressure.

9. A process of uniting pieces of leather by means of a liquid adhesive comprising a partial polyvinyl acetal resin, a plasticizer therefor, a moderately high boiling solvent and chrome orange in an amount not exceeding substantially 5% by weight of the resin, which comprises applying the adhesive to leather, activating said adhesive by radiant heat at a temperature below the scorch point of the leather and then placing the pieces of leather with the adhesive treated surfaces in contact with each other, and uniting by means of pressure.

10. A process of uniting pieces of leather by means of a liquid adhesive comprising a partial polyvinyl acetal resin made with butyraldehyde, a plasticizer therefor, a moderately high boiling solvent and burnt umber in an amount not exceeding substantially 5% by weight of the resin, which comprises applying the adhesive to leather, activating said adhesive by radiant heat at a temperature below the scorch point of the leather, and then placing the pieces of leather with the adhesive treated surfaces in contact with each other, and uniting by means of pressure.

11. A process of uniting pieces of leather by means of a liquid adhesive comprising a partial polyvinyl acetal resin made with butyraldehyde, a plasticizer therefor, a moderately high boiling solvent and a mixed cadmium and lithopone pigment in an amount not exceeding substantially 5% by weight of the resin, which comprises applying the adhesive to leather, activating said adhesive by radiant heat at a temperature below the scorch point of the leather, and then placing the pieces of leather with the adhesive treated surfaces in contact with each other, and uniting by means of pressure.

12. A process of uniting pieces of leather by means of a liquid adhesive comprising a partial polyvinyl acetal resin made with butyraldehyde, a plasticizer therefor, a moderately high boiling solvent and chrome orange in an amount not exceeding substantially 5% by weight of the resin, which comprises applying the adhesive to leather, activating said adhesive by radiant heat at a temperature below the scorch point of the leather, and then placing the pieces of leather with the adhesive treated surfaces in contact with each other, and uniting by means of pressure.

13. A process of uniting pieces of leather by means of an adhesive comprising a partial polyvinyl acetal resin made with butyraldehyde about 100 parts, plasticizer about 30 parts, and burnt umber about 1 part, which comprises applying said adhesive to leather, activating said adhesive solely by externally applied heat at a temperature below the scorch point of leather, and then placing the pieces of leather with the adhesive treated surfaces in contact with each other, and uniting by means of pressure.

14. A process of uniting pieces of leather by means of an adhesive comprising a partial polyvinyl acetal resin made with butyraldehyde about 100 parts, plasticizer about 30 parts, and a mixed cadmium and lithopone pigment about 5 parts, which comprises applying the adhesive to leather, activating said adhesive solely by externally applied heat at a temperature below the scorch point of leather, and then placing the pieces of leather with the adhesive treated surfaces in contact with each other, and uniting by means of pressure.

15. A process of uniting pieces of leather by means of an adhesive comprising a partial polyvinyl acetal resin made with butyraldehyde about 100 parts, plasticizer about 30 parts, and chrome orange about 5 parts, which comprises applying the adhesive to leather, activating said adhesive solely by externally applied heat at a temperature below the scorch point of leather, and then placing the pieces of leather with the adhesive treated surfaces in contact with each other, and uniting by means of pressure.

16. A process of uniting pieces of leather by means of an adhesive comprising a partial polyvinyl acetal resin made with butyraldehyde about 100 parts, plasticizer 30 parts, burnt umber about 1 part, and mono-ethyl ether of diethylene glycol about 0.5 to 5 parts, which comprises applying said adhesive to leather, allowing said adhesive treated leather to stand for prolonged periods of time, activating said adhesive solely by externally applied heat at a temperature below the scorch point of leather, and then placing the pieces of leather with the adhesive treated surfaces in contact with each other, and uniting by means of pressure.

17. A process of uniting pieces of leather by means of an adhesive comprising a partial polyvinyl acetal resin made with butyraldehyde about 100 parts, plasticizer about 30 parts, a mixed cadmium and lithopone pigment about 5 parts, and mono-ethyl ether of diethylene glycol about 0.5 to 5 parts, which comprises applying said adhesive to leather, allowing said adhesive treated leather to stand for prolonged periods of time, activating said adhesive solely by externally applied heat at a temperature below the scorch point of leather, and then placing the pieces of leather with the adhesive treated surfaces in contact with each other, and uniting by means of pressure.

18. A process of uniting pieces of leather by means of an adhesive comprising a partial polyvinyl acetal resin made with butyraldehyde about 100 parts, plasticizer about 30 parts, chrome orange about 5 parts, and mono-ethyl ether of diethylene glycol about 0.5 to 5 parts, which comprises applying said adhesive to leather, allowing said adhesive treated leather to stand for prolonged periods of time, activating said adhesive solely by externally applied heat at a temperature below the scorch point of leather, and then placing the pieces of leather with the adhesive treated surfaces in contact with each other, and uniting by means of pressure.

FREDERICK S. BACON.

---

CERTIFICATE OF CORRECTION.

Patent No. 2,361,527.     October 31, 1944.

FREDERICK S. BACON.

It is hereby certified that error appears in the printed specification of the above numbered patent requiring correction as follows: Page 1, second column, line 15, for the numeral "40" read --30--; and that the said Letters Patent should be read with this correction therein that the same may conform to the record of the case in the Patent Office.

Signed and sealed this 13th day of February, A. D. 1945.

Leslie Frazer (Seal)     Acting Commissioner of Patents.

adhesive solely by externally applied heat at a temperature below the scorch point of leather, and then placing the pieces of leather with the adhesive treated surfaces in contact with each other, and uniting by means of pressure.

14. A process of uniting pieces of leather by means of an adhesive comprising a partial polyvinyl acetal resin made with butyraldehyde about 100 parts, plasticizer about 30 parts, and a mixed cadmium and lithopone pigment about 5 parts, which comprises applying the adhesive to leather, activating said adhesive solely by externally applied heat at a temperature below the scorch point of leather, and then placing the pieces of leather with the adhesive treated surfaces in contact with each other, and uniting by means of pressure.

15. A process of uniting pieces of leather by means of an adhesive comprising a partial polyvinyl acetal resin made with butyraldehyde about 100 parts, plasticizer about 30 parts, and chrome orange about 5 parts, which comprises applying the adhesive to leather, activating said adhesive solely by externally applied heat at a temperature below the scorch point of leather, and then placing the pieces of leather with the adhesive treated surfaces in contact with each other, and uniting by means of pressure.

16. A process of uniting pieces of leather by means of an adhesive comprising a partial polyvinyl acetal resin made with butyraldehyde about 100 parts, plasticizer 30 parts, burnt umber about 1 part, and mono-ethyl ether of diethylene glycol about 0.5 to 5 parts, which comprises applying said adhesive to leather, allowing said adhesive treated leather to stand for prolonged periods of time, activating said adhesive solely by externally applied heat at a temperature below the scorch point of leather, and then placing the pieces of leather with the adhesive treated surfaces in contact with each other, and uniting by means of pressure.

17. A process of uniting pieces of leather by means of an adhesive comprising a partial polyvinyl acetal resin made with butyraldehyde about 100 parts, plasticizer about 30 parts, a mixed cadmium and lithopone pigment about 5 parts, and mono-ethyl ether of diethylene glycol about 0.5 to 5 parts, which comprises applying said adhesive to leather, allowing said adhesive treated leather to stand for prolonged periods of time, activating said adhesive solely by externally applied heat at a temperature below the scorch point of leather, and then placing the pieces of leather with the adhesive treated surfaces in contact with each other, and uniting by means of pressure.

18. A process of uniting pieces of leather by means of an adhesive comprising a partial polyvinyl acetal resin made with butyraldehyde about 100 parts, plasticizer about 30 parts, chrome orange about 5 parts, and mono-ethyl ether of diethylene glycol about 0.5 to 5 parts, which comprises applying said adhesive to leather, allowing said adhesive treated leather to stand for prolonged periods of time, activating said adhesive solely by externally applied heat at a temperature below the scorch point of leather, and then placing the pieces of leather with the adhesive treated surfaces in contact with each other, and uniting by means of pressure.

FREDERICK S. BACON.

CERTIFICATE OF CORRECTION.

Patent No. 2,361,527.　　　　　　　　　　　　　October 31, 1944.

FREDERICK S. BACON.

It is hereby certified that error appears in the printed specification of the above numbered patent requiring correction as follows: Page 1, second column, line 15, for the numeral "40" read --30--; and that the said Letters Patent should be read with this correction therein that the same may conform to the record of the case in the Patent Office.

Signed and sealed this 13th day of February, A. D. 1945.

Leslie Frazer (Seal)　　　　　　　　　　　　　　　Acting Commissioner of Patents.